United States Patent
Imamura et al.

(10) Patent No.: US 10,821,809 B2
(45) Date of Patent: Nov. 3, 2020

(54) INFORMATION DISPLAY DEVICE, INFORMATION DISPLAY METHOD, AND STORAGE MEDIUM

(71) Applicant: CASIO COMPUTER CO., LTD., Shibuya-ku (JP)

(72) Inventors: Keiichi Imamura, Tokyo (JP); Norihito Hanafusa, Kanagawa (JP); Taichiro Tsujimura, Tokyo (JP); Shinichi Moritani, Hamura (JP); Tomokazu Yamaguchi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 100 days.

(21) Appl. No.: 15/636,337

(22) Filed: Jun. 28, 2017

(65) Prior Publication Data
US 2017/0300013 A1 Oct. 19, 2017

(30) Foreign Application Priority Data

Jun. 30, 2016 (JP) ................................ 2016-130771

(51) Int. Cl.
*G04B 49/00* (2006.01)
*B60H 1/00* (2006.01)
(Continued)

(52) U.S. Cl.
CPC ........... *B60H 1/00921* (2013.01); *B60H 1/20* (2013.01); *B60H 1/2221* (2013.01);
(Continued)

(58) Field of Classification Search
CPC .. G04B 49/00; B60H 1/00921; B60H 1/3223; B60H 1/3204; B60H 1/3228; B60H 1/20;
(Continued)

(56) References Cited

U.S. PATENT DOCUMENTS 3,545,199 A * 12/1970 William, Jr. ........... G01C 17/34
                                                          368/14
4,337,530 A    6/1982 Toft, Jr.
(Continued)

FOREIGN PATENT DOCUMENTS

CA      2376516      12/2000
CN      2058505 U    6/1990
(Continued)

OTHER PUBLICATIONS

Office Action dated Jun. 5, 2019 issued in Chinese Patent Application No. 201710491329.6.
(Continued)

*Primary Examiner* — Sean Kayes
(74) *Attorney, Agent, or Firm* — Cozen O'Connor

(57) ABSTRACT

An information display device comprising a processor, the processor executing: time information acquiring processing of acquiring time information; azimuth information acquiring processing of acquiring azimuth information; coordinate setting processing of setting a time coordinate system for display of the time information on a display image and setting an azimuth coordinate system for display of the azimuth information on the display image; and display control processing of displaying particular time information acquired by the time information acquiring processing, in the time coordinate system set on the display image and particular azimuth information acquired by the azimuth information acquiring processing, in the azimuth coordinate system set on the display image.

20 Claims, 14 Drawing Sheets

(51) Int. Cl.
*B60H 1/32* (2006.01)
*F25B 5/02* (2006.01)
*F25B 40/00* (2006.01)
*F25B 40/02* (2006.01)
*F25B 49/02* (2006.01)
*F25B 29/00* (2006.01)
*F25B 30/02* (2006.01)
*B60H 1/20* (2006.01)
*B60H 1/22* (2006.01)
*B60H 3/02* (2006.01)

(52) U.S. Cl.
CPC ......... *B60H 1/3204* (2013.01); *B60H 1/3223* (2013.01); *B60H 1/3228* (2019.05); *B60H 3/024* (2013.01); *F25B 5/02* (2013.01); *F25B 29/003* (2013.01); *F25B 30/02* (2013.01); *F25B 40/00* (2013.01); *F25B 40/02* (2013.01); *F25B 49/022* (2013.01); *G04B 49/00* (2013.01); *F25B 2339/047* (2013.01); *F25B 2341/0662* (2013.01); *F25B 2400/0403* (2013.01); *F25B 2400/0409* (2013.01); *F25B 2400/0411* (2013.01); *F25B 2400/0417* (2013.01); *F25B 2400/13* (2013.01); *F25B 2400/23* (2013.01); *F25B 2600/021* (2013.01)

(58) Field of Classification Search
CPC ......... B60H 1/2221; B60H 3/024; F25B 5/02; F25B 40/02; F25B 49/022; F25B 29/003; F25B 30/02; F25B 2339/047; F25B 2341/0662; F25B 2400/0403; F25B 2400/0411; F25B 2400/0417; F25B 2400/13; F25B 2400/23; F25B 2400/021
See application file for complete search history.

(56) References Cited

U.S. PATENT DOCUMENTS

| | | | | |
|---|---|---|---|---|
| 5,550,794 | A | * | 8/1996 | Born .................... G04B 47/065 33/271 |
| 5,631,878 | A | * | 5/1997 | Chen ..................... G04B 23/02 368/21 |
| 6,754,137 | B1 | * | 6/2004 | Bourquin ........... G04C 17/0091 368/10 |
| 6,901,032 | B1 | | 5/2005 | Eo et al. |
| 7,466,633 | B2 | * | 12/2008 | Giauque ............. G04B 47/065 33/354 |
| 8,848,487 | B2 | * | 9/2014 | Eylon-Azoulay ........ G04G 9/02 368/14 |
| 2005/0105397 | A1 | * | 5/2005 | Tuason ................ G04B 19/262 368/21 |
| 2008/0008049 | A1 | * | 1/2008 | Landsberg ............ G04B 19/26 368/15 |
| 2008/0151697 | A1 | * | 6/2008 | Giauque ............. G04B 47/065 368/14 |
| 2013/0116967 | A1 | * | 5/2013 | Akcasu ................... G04G 9/00 702/150 |

FOREIGN PATENT DOCUMENTS

| | | |
|---|---|---|
| CN | 1367885 | 9/2002 |
| CN | 103514800 | 1/2014 |
| DE | 4037750 | 6/1992 |
| FR | 2488419 | 2/1982 |
| JP | H09-257954 | 10/1997 |
| JP | 2001-165695 | 6/2001 |
| JP | 2003-502648 | 1/2003 |
| JP | 2009-216547 | 9/2009 |
| JP | 2011-122952 | 6/2011 |
| JP | 2016-138779 | 8/2016 |
| WO | WO 02/054157 | 7/2002 |
| WO | WO 2013/168511 | 11/2013 |

OTHER PUBLICATIONS

Notification of Reasons for Refusal dated Jun. 2, 2020 issued in Japanese Patent Application No. 2016-130771.

* cited by examiner

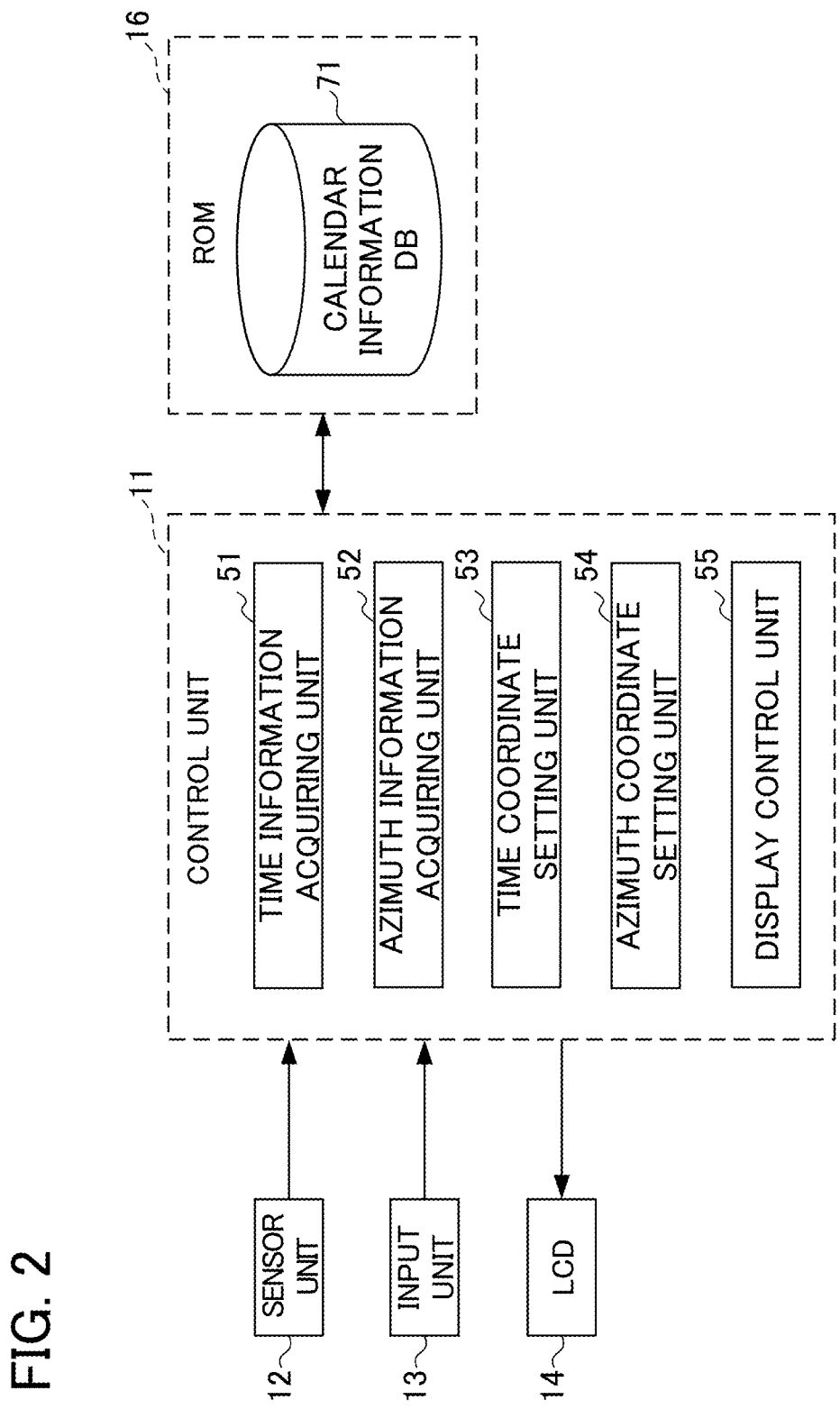

TIME COORDINATE SYSTEM

SUNSET TIME

SUNRISE TIME

AZIMUTH COORDINATE SYSTEM

SUNSET AZIMUTH

SUNRISE AZIMUTH

TIME COORDINATE SYSTEM

SUNSET TIME

SUNRISE TIME

AZIMUTH COORDINATE SYSTEM

SUNSET AZIMUTH

SUNRISE AZIMUTH

INFORMATION DISPLAY DEVICE, INFORMATION DISPLAY METHOD, AND STORAGE MEDIUM

CROSS-REFERENCE TO RELATED APPLICATIONS

This application is based upon and claims the benefit of priority under 35 USC 119 of Japanese Patent Application No. 2016-130771 filed on Jun. 30, 2016 the entire disclosure of which, including the description, claims, drawings, and abstract, is incorporated herein by reference in its entirety.

BACKGROUND OF THE INVENTION

Field of the Invention

The present invention relates to an information display device, an information display method, and a storage medium.

Related Art

An arm-mounted apparatus for notifying a sunrise time and a sunset time has conventionally been known. For example, Japanese Unexamined Patent Application, Publication No. 2011-122952 discloses an analog electronic clock for notifying a sunrise time or a sunset time by displaying a length of time from a current time to a sunrise time or from the current time to a sunset time.

SUMMARY OF THE INVENTION

An information display device according to one aspect of the present invention comprises a processor, the processor executes: time information acquiring processing of acquiring time information; azimuth information acquiring processing of acquiring azimuth information; display processing of generating a display image for the time information and the azimuth information; time coordinate setting processing of setting a time coordinate system for display of the time information on the display image; azimuth coordinate setting processing of setting an azimuth coordinate system for display of the azimuth information on the display image; and display control processing of displaying particular time information in the time coordinate system set on the display image and particular azimuth information in the azimuth coordinate system set on the display image.

An information display method according to one aspect of the present invention is implemented by an information display device, the method comprises: time information acquiring processing of acquiring time information; azimuth information acquiring processing of acquiring azimuth information; display processing of generating a display image for the time information and the azimuth information; time coordinate setting processing of setting a time coordinate system for display of the time information on the display image; azimuth coordinate setting processing of setting an azimuth coordinate system for display of the azimuth information on the display image; and display control processing of displaying particular time information in the time coordinate system set on the display image and particular azimuth information in the azimuth coordinate system set on the display image.

A non-transitory storage medium according to one aspect of the present invention is encoded with a computer-readable program that controls a processor of an information display apparatus to execute: time information acquiring processing of acquiring time information; azimuth information acquiring processing of acquiring azimuth information; display processing of generating a display image for the time information and the azimuth information; time coordinate setting processing of setting a time coordinate system for display of the time information on the display image; azimuth coordinate setting processing of setting an azimuth coordinate system for display of the azimuth information on the display image; and display control processing of displaying particular time information in the time coordinate system set on the display image and particular azimuth information in the azimuth coordinate system set on the display image.

BRIEF DESCRIPTION OF THE DRAWINGS

FIG. 2 is a functional block diagram showing a functional configuration forming the functional configuration of the wrist terminal and responsible for execution of information display processing;

DETAILED DESCRIPTION OF THE INVENTION

Embodiments of the present invention will be explained with reference to the drawings.

In the following, embodiments of the present invention are described with reference to the drawings.

First Embodiment

[Hardware Configuration]

Figure 1A:
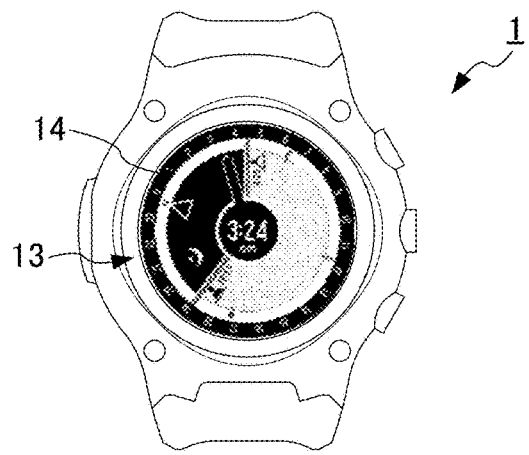
FIG. 1A is an external view showing the configuration of a wrist terminal as an embodiment of an information display device according to the present invention.
Figure 1B:
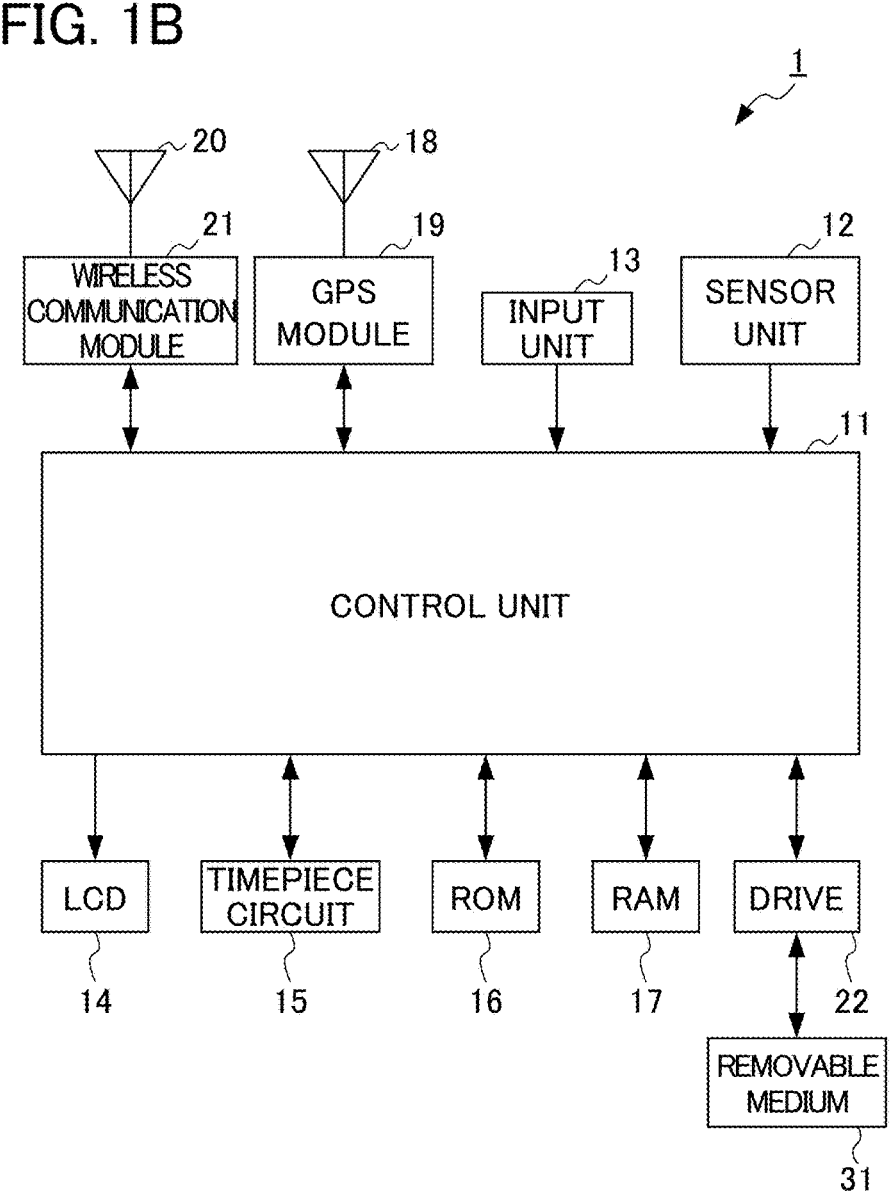
FIG. 1B is a block diagram showing the hardware configuration of the wrist terminal as the embodiment of the information display device according to the present invention.

FIGS. 1A and 1B are diagrams illustrating the configuration of the wrist terminal 1 a wrist terminal as an embodiment of an information display device according to the present invention, with FIG. 1A being a view illustrating an outer appearance thereof, and FIG. 1B being a block diagram illustrating a hardware configuration thereof. The wrist terminal 1 is an electronic apparatus that is configured to be of wristwatch type and has functions similar to a smart phone. As illustrated in FIGS. 1A and 1B, the wrist terminal 1 includes a control unit 11, a sensor unit 12, an input unit 13, an LCD (Liquid Crystal Display) 14, a timepiece circuit 15, ROM (Read Only Memory) 16, RAM (Read Access Memory) 17, a GPS antenna 18, a GPS module 19, a wireless communication antenna 20, a wireless communication module 21, and a drive 22. Where appropriate, the wrist terminal 1 can include different hardware such as an imaging unit.

The control unit 11 is configured with an arithmetic processing unit such as a CPU (Central Processing Unit) and controls the overall operation of the wrist terminal 1. For example, the control unit 11 executes various types of processing according to a program such as a program for location estimating processing (described later) stored in the ROM 16. The sensor unit 12 includes various types of sensors such as a magnetic field sensor, a three-axis acceleration sensor, a pressure sensor, and altitude sensor.

The input unit 13 is configured with various buttons or capacitive-type or resistance-film-type position input sensors laminated on a display area of the LCD 14, and inputs various types of information according to a user's operation for instruction. The LCD 14 outputs an image according to an instruction of the control unit 11. For example, the LCD 14 displays various images and screens of a user interface. In the present embodiment, a position input sensor of the input unit 13 is arranged so as to be superimposed on the LCD 14 to constitute a touch screen. According to this embodiment, the LCD 14 has a substantially circular display region. As a result of the information display processing, a time coordinate system for display of time information and an azimuth coordinate system for display of azimuth information are set in the display region. The timepiece circuit 15 generates a time signal from signals generated by a system clock or oscillator to output the current time.

The ROM 16 stores information such as control programs executed by the control unit 11. The RAM 17 provides a work area upon the control unit 11 executing various types of processing. The GPS antenna 18 receives radio waves sent from satellites for GPS, converts them into electrical signals, and outputs the electrical signals thus converted (hereinafter, referred to as "GPS signal") to the GPS module 19. The GPS module 19 detects the location (latitude, longitude, and altitude) of the wrist terminal 1 and the current time shown by the GPS based on the GPS signals inputted from the GPS antenna 18. Furthermore, the GPS module 19 outputs information showing the location thus detected and the current time to the control unit 11.

The wireless communication antenna 20 is an antenna that can receive radio waves of frequencies corresponding to wireless communication used by the wireless communication module 21 and is configured with a loop antenna and a rod antenna, for example. The wireless communication antenna 20 sends electrical signals of wireless communication inputted from the wireless communication module 21 as electromagnetic waves, converts the electromagnetic waves thus received into electrical signals, and outputs them to the wireless communication module 21. The wireless communication module 21 sends signals to another apparatus via the wireless communication antenna 20 in accordance with an instruction from the control unit 11. Furthermore, the wireless communication module 21 receives signals sent from another apparatus and outputs information indicated by the signals thus received to the control unit 11. A removable medium 31 composed of a magnetic disk, an optical disk, a magneto-optical disk, semiconductor memory or the like is installed in the drive 22, as appropriate. The removable medium 31 can store a variety of data such as the image data.

[Functional Configuration]

Next, a functional configuration of the wrist terminal 1 is described. FIG. 2 is a functional block diagram illustrating a functional configuration for executing information display processing among the functional configurations of the wrist terminal 1.

The information display processing is a series of steps including: setting a time coordinate system in 24-hour notation by allocating coordinates uniformly in a peripheral direction of the display region of the LCD 14; allocating the coordinates of a sunrise azimuth and those of a sunset azimuth fixedly to the position of a sunrise time and that of a sunset time in the time coordinate system respectively; setting an azimuth coordinate system by allocating coordinates between the sunrise azimuth and the sunset azimuth in such a manner as to conform to these azimuths; and displaying various types of information including the sunrise time, the sunset time, the sunrise azimuth, and the sunset azimuth in a coordinate system formed by superimposing (combining) the time coordinate system and the azimuth coordinate system.

As shown in FIG. 2, to execute the information display processing, a time information acquiring unit 51, an azimuth information acquiring unit 52, a time coordinate setting unit 53, an azimuth coordinate setting unit 54, and a display control unit 55 come into operation in the control unit 11. The ROM 16 stores a calendar information database (calendar information DB) 71.

The calendar information DB 71 is a database storing sunrise times, sunset times, sunrise azimuths, and sunset azimuths covering a predetermined length of time (50 years, for example) observed at principal points. Specifically, referring to the calendar information DB 71 makes it possible to determine a sunrise time, a sunset time, a sunrise azimuth, and a sunset azimuth on a particular date at a particular point, for example.

The time information acquiring unit 51 acquires information indicating a current time output from the timepiece circuit 15. The azimuth information acquiring unit 52 acquires information indicating an azimuth at the wrist terminal 1 (north, south, east or west, for example) based on information indicating the direction of Earth's magnetic field output from the magnetic field sensor of the sensor unit 12.

The time coordinate setting unit 53 sets a time coordinate system in 24-hour notation by dividing the display region of the LCD 14 uniformly in the peripheral direction, and allocating the divided regions to 24-hour times. Specifically, if a current time is indicated by an hour hand in the time coordinate system, the hour hand rotates at a uniform speed in the display region of the LCD 14 to make one revolution in 24 hours. The azimuth coordinate setting unit 54 sets an azimuth coordinate system indicating an azimuth in association with the time coordinate system. For this setting, the azimuth coordinate setting unit 54 allocates the coordinates of a sunrise azimuth and those of a sunset azimuth fixedly to the position of a sunrise time and that of a sunset time in the time coordinate system respectively. Further, the azimuth coordinate setting unit 54 allocates coordinates between the sunrise azimuth and the sunset azimuth in such a manner as to conform to the coordinates of the sunrise azimuth and those of the sunset azimuth.

Figure 3A:
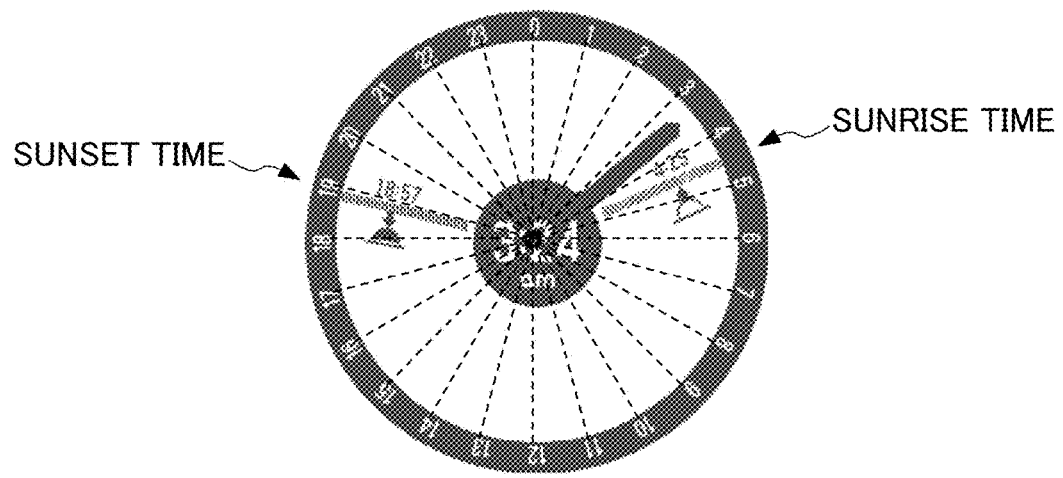
FIG. 3A is a schematic view showing a time coordinate system that is set together with an azimuth coordinate system according to the embodiment.
Figure 3B:
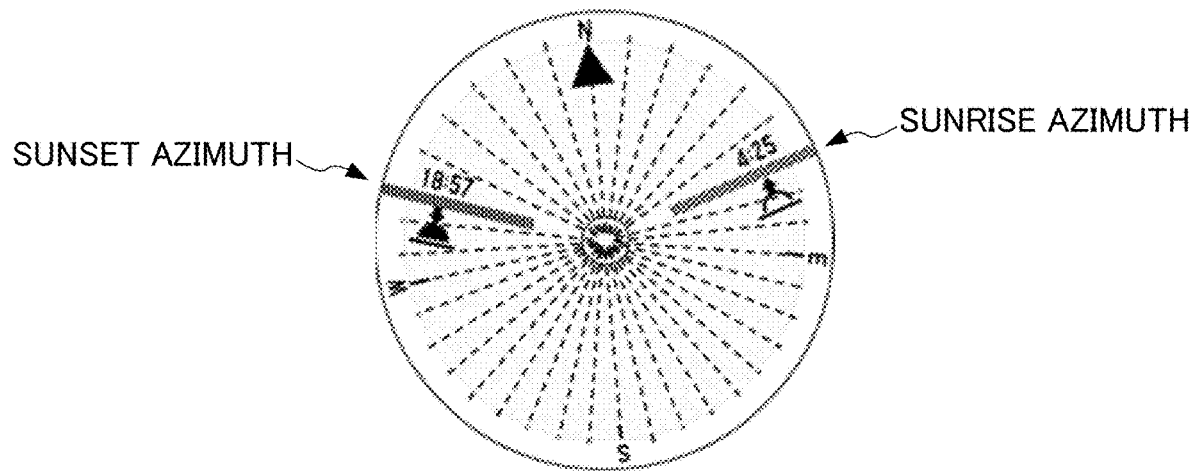
FIG. 3B is a schematic view showing the azimuth coordinate system that is set together with the time coordinate system according to the embodiment.

FIGS. 3A and 3B are schematic views showing the time coordinate system and the azimuth coordinate system set according to this embodiment. FIG. 3A shows the time coordinate system. FIG. 3B shows the azimuth coordinate system. As shown in FIG. 3A, in the time coordinate system, the coordinates of corresponding times are allocated uniformly in the peripheral direction of the display region of the LCD 14. As shown in FIG. 3B, in the azimuth coordinate system, azimuths are allocated in a non-uniform manner in the peripheral direction of the display region of the LCD 14. Referring to FIG. 3A, each of the position of a sunrise time and that of a sunset time is displayed together with an icon indicating sunrise or sunset and numbers indicating the time of sunrise or that of sunset. The position of 4:25 in the time coordinate system shows a sunrise time, and the position of 18:57 in the time coordinate system shows a sunset time. Referring to FIG. 3B, each of the position of a sunrise azimuth and that of a sunset azimuth is displayed together with an icon indicating sunrise or sunset and numbers indicating the time of sunrise or that of sunset. The sunrise azimuth and the sunset azimuth in the azimuth coordinate system are fixedly allocated to the same positions as the position of the sunrise time and that of the sunset time respectively in the time coordinate system. Specifically, as shown in FIG. 3B, in the azimuth coordinate system, the sunrise azimuth and the sunset azimuth are allocated fixedly to the coordinates of the sunrise time and those of the sunset time respectively. Thus, the coordinates of the other azimuths are allocated in a skewed state (a state shifted from a uniformly allocated state). A method of setting the azimuth coordinate system by the azimuth coordinate setting unit 54 will be described later.

Figure 4:
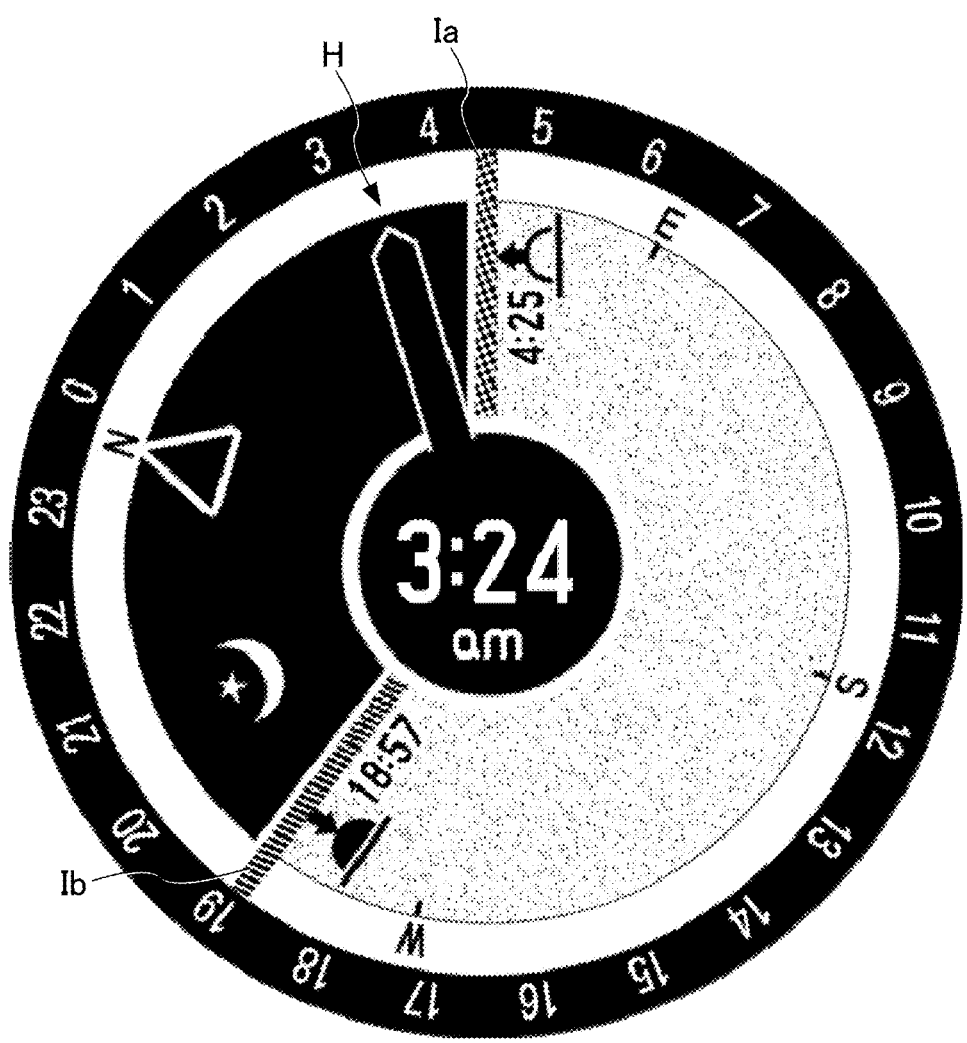
FIG. 4 is a schematic view showing an example of a display image displayed by a display control unit.

The display control unit 55 displays various types of information including a sunrise time, a sunset time, a sunrise azimuth, and a sunset azimuth in a coordinate system formed by superimposing (combining) the time coordinate system set by the time coordinate setting unit 53 and the azimuth coordinate system associated with the time coordinate system. The display control unit 55 rotates the coordinate system resulting from superimposition (combination) of the time coordinate system and the azimuth coordinate system so as to respond to every output from the magnetic field sensor (specifically, the direction of a user), and displays the rotated coordinate system on the LCD 14. FIG. 4 is a schematic view showing an example of a display image displayed by the display control unit 55. As shown in FIG. 4, the display control unit 55 displays an image of the face of an analog clock in which an hour hand H rotates about the center of the display region of the LCD 14. The display control unit 55 also displays a first index Ia indicating a sunrise time and a second index Ib indicating a sunset time in the image of the clock face.

In the image of the clock face, the first index Ia is expressed as a line segment connecting the center of the display region and a sunrise time in the time coordinate system (here, "4:25"). Likewise, in the image of the clock face, the second index Ib is expressed as a line segment connecting the center of the display region and a sunset time in the time coordinate system (here, "18:57"). The sunrise time and the sunset time are displayed as numerical values near the first index Ia and the second index Ib respectively. In the time coordinate system, the first index Ia and the second index Ib partition the display region into a region corresponding to daytime and shown in a bright color (white, for example), and a region corresponding to nighttime and shown in a dark color (black, for example). An icon indicating sunrise and an icon indicating sunset are displayed near the first index Ia and the second index Ib respectively.

As described above, the position of a sunrise time and that of a sunset time in the time coordinate system are allocated fixedly to the coordinates of a sunrise azimuth and those of a sunset azimuth respectively. Thus, the first index Ia indicates a sunrise azimuth in the azimuth coordinate system, whereas the second index Ib indicates a sunset azimuth in the azimuth coordinate system. According to this embodiment, an azimuth indicated in the azimuth coordinate system and an actual azimuth match each other if the first index Ia or the second index Ib points to a particular direction in the display region of the LCD 14 (an upward direction from the center of the display region of the LCD 14 in FIG. 4, for example). Thus, if a user sets the direction of the wrist terminal 1 for checking a sunrise azimuth or a sunset azimuth so as to point the first index Ia or the second index Ib to the particular direction in the display region of the LCD 14, an exact sunrise azimuth or an exact sunset azimuth is indicated by the direction of the first index Ia or that of the second index Ib respectively in the azimuth coordinate system. Except for the case where the direction of the wrist terminal 1 is set so as to point the first index Ia or the second index Ib to the particular direction in the display region of the LCD 14, each azimuth indicated in the azimuth coordinate system is shifted from an actual azimuth. Hence, a direction shown in FIG. 4, etc. (such as "N" indicating the direction north) does not indicate an exact direction but it functions as a rough indication of a direction. A coordinate system may also be set so as not to include symbols ("E," "W," "S," and "N," etc.) as rough indications of the direction east, west, south and north, etc.

[Method of Setting Coordinate System]

Figure 5:
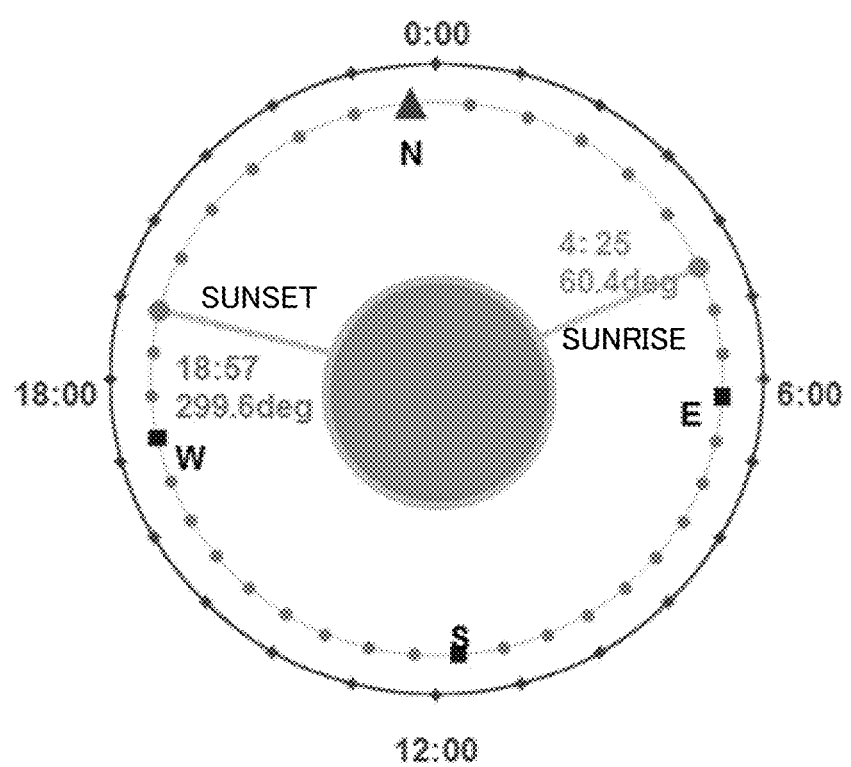
FIG. 5 is a schematic view showing an example of a relationship between a time coordinate system and an azimuth coordinate system set at the wrist terminal.

A method of setting a coordinate system at the wrist terminal 1 will be described next. FIG. 5 is a schematic view showing an example of a relationship between the time coordinate system and the azimuth coordinate system set at the wrist terminal 1. As described above, in the time coordinate system set by the time coordinate setting unit 53, the display region of the LCD 14 is divided uniformly in the peripheral direction and the divided regions are allocated to 24-hour times. More specifically, the outer periphery of the display region of the LCD 14 having an angle of 360 degrees is divided by 24 hours, so that an angle allocated to one hour is 15 degrees and an angle allocated to one minute is 15/60 degrees.

It is assumed that the display region of the LCD 14 has a size of 320 [pixel]*320 [pixel], and a circle indicating the time coordinate system and having a radius Rt=160 [pixel] is drawn around central coordinates X0=160 and Y0=160. Assuming that a 6 o'clock position in FIG. 5 is a reference position (zero degrees) for the sake of convenience, the coordinates (Xt, Yt) of each time can be expressed by the following formulas (1) and (2). Angles in the following formulas (1) and (2) are expressed in units of radians.

$$Xt=(\cos(\alpha*2\pi/24)*Rt)+X0 \quad (1)$$

$$Yt=(\sin((\alpha*2\pi/24)*Rt)+Y0 \quad (2)$$

The sign $\alpha$ shows an angular factor responsive to a time. The angular factor $\alpha$ at each time is defined as follows:
In a period from 6:00 to 24:00, $\alpha$=(numerical value of time−6); and
In a period from 0:00 to 6:00, $\alpha$=(numerical value of time+18).
The angular factor $\alpha$ for a time except every hour on the hour can also be calculated by using a numerical value obtained by converting "minute" and "second" as a minimum unit to "time." As a result, the time coordinates of corresponding times are allocated uniformly in the peripheral direction of the display region of the LCD 14.

For plot of a sunrise time and a sunset time in the time coordinate system, the coordinates of these times can be calculated in the same way as the above-described time. For example, a sunrise time and a sunset time in Tokyo, on Jun. 12, 2015 are 4:25 and 18:57 respectively. If a radius Rs to be used for plotting the sunrise time and the sunset time is set at 140 [pixel] shorter than the above-described radius Rt, the coordinates of the sunrise time and those of the sunset time can be expressed by the following formulas (3) and (4). Angles in the following formulas (3) and (4) are expressed in units of radians.

$$Xs=(\cos(\alpha*2\pi/24)*Rs)+X0 \quad (3)$$

$$Ys=(\sin((\alpha*2\pi/24)*Rs)+Y0 \quad (4)$$

The angular factor $\alpha$ in the formulas (3) and (4) is the same as the one described above. Thus, an angular factor $\alpha 1$ and an angular factor $\alpha 2$ for the sunrise time and the sunset time respectively are calculated as follows.
Regarding sunrise, $$\alpha 1=22+(25/60)=22.42.$$

Regarding sunset, $$\alpha 2=12+(57/60)=12.95.$$

By substituting the values of $\alpha 1$ and $\alpha 2$ into the formulas (3) and (4) respectively, the following values can be calculated as the coordinates (Xs1, Ys1) of the sunrise time and the coordinates (Xs2, Ys2) of the sunset time.

Coordinates (Xs1, Ys1) of sunrise time=(288.2, 103.7)
Coordinates (Xs2, Ys2) of sunset time=(24.3, 125.5)

Figure 6:
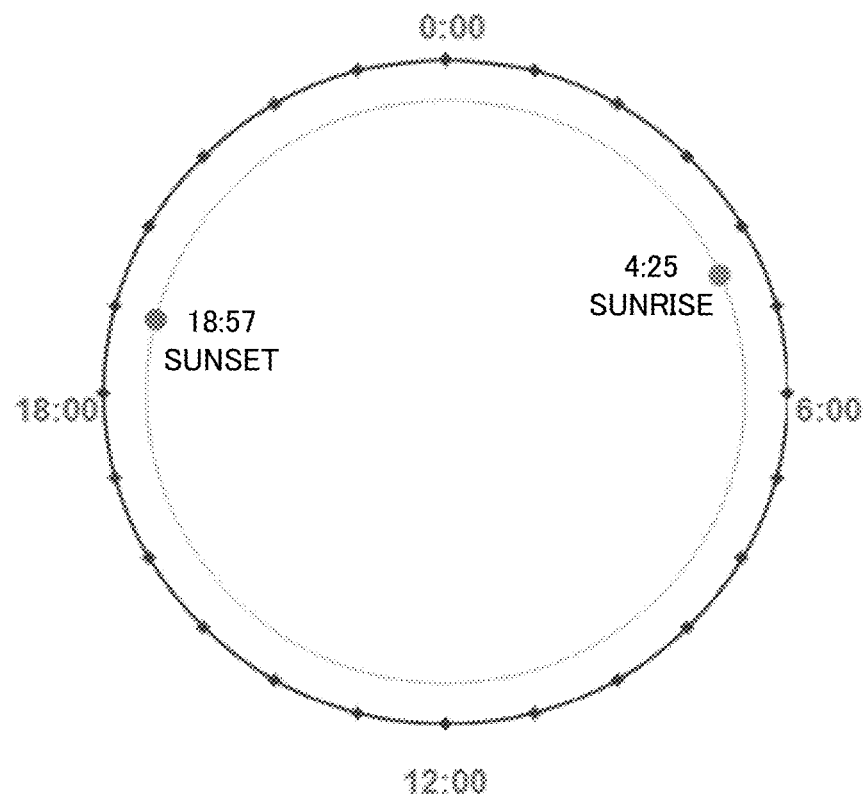
FIG. 6 is a schematic view showing a result given by plotting a sunrise time and a sunset time in the time coordinate system.

FIG. 6 is a schematic view showing a result given by plotting the sunrise time and the sunset time in the time coordinate system. As shown in FIG. 6, coordinates indicating the sunrise time and the sunset time in the time coordinate system are plotted on the periphery of a circle with the radius Rs. If the coordinates of the sunrise time and those of the sunset time determined in this way are fixed, an actual sunrise azimuth and an actual sunset azimuth do not always match the coordinates of the sunrise time and those of the sunset time in the time coordinate system. Specifically, based on the assumption that one revolution (360 degrees) is made in 24 hours, a sunrise azimuth angle and a sunset azimuth angle, determined by the coordinates of the sunrise time and those of the sunset time in the time coordinate system, are obtained as follows by converting the values of $\alpha 1$ and $\alpha 2$. For the sake of convenience, a 6 o'clock position is used as a reference position (zero degrees).

A sunrise azimuth As1 is obtained as follows:

$$As1=(\alpha 1/24)*360=336.3 \text{ degrees}$$

A sunset azimuth As2 is obtained as follows:

$$As2=(\alpha 2/24)*360=194.25 \text{ degrees}$$

Meanwhile, an actual sunrise azimuth and an actual sunrise azimuth, observed in Tokyo, on Jun. 12, 2015, are 60.4 degrees and 299.6 degrees, respectively. The actual sunrise azimuth and the actual sunset azimuth are defined in a clockwise direction as a normal direction relative to the direction north at zero degrees. Thus, if the actual sunrise azimuth and the actual sunset azimuth are rotated so as to conform to the time coordinate system to make the sunrise azimuth match an azimuth (As=336.3 degrees) determined based on the sunrise time, a resultant sunset azimuth is 215.5 degrees.

Figure 7:
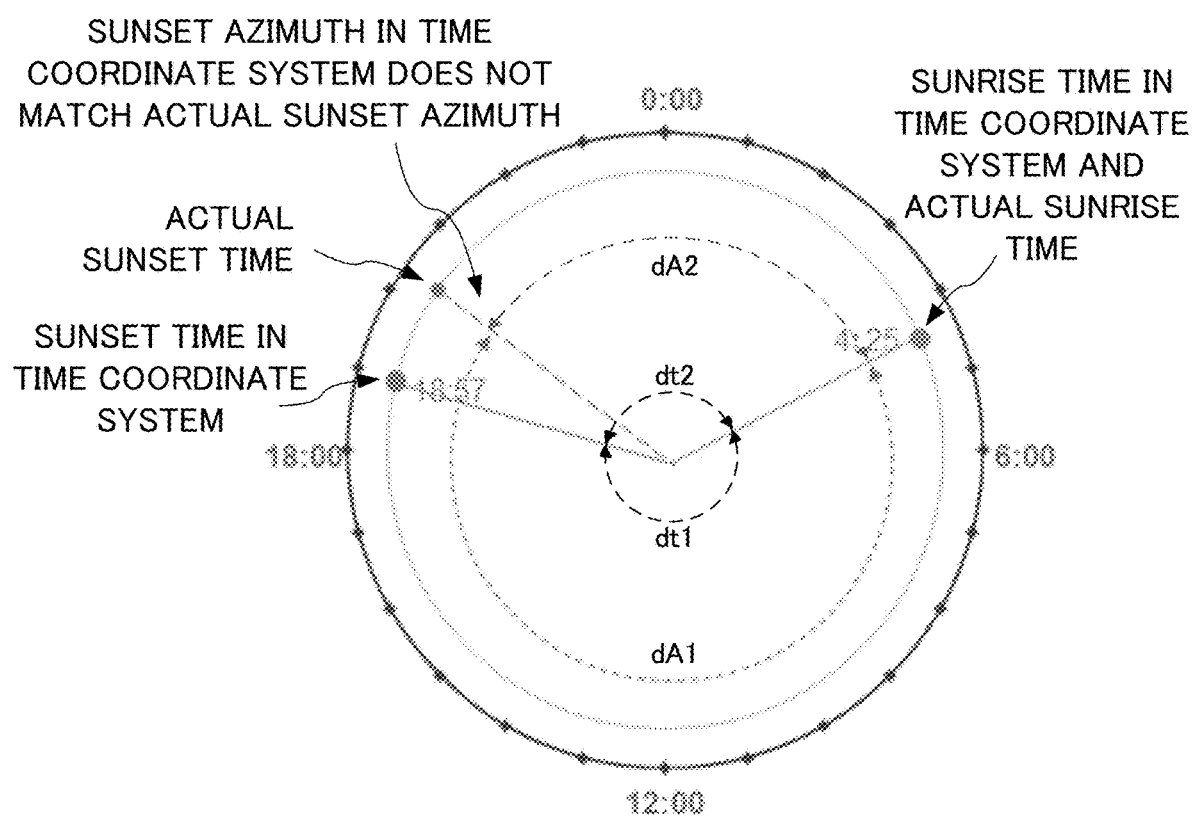
FIG. 7 is a schematic view showing a state formed by rotating an actual sunrise azimuth and an actual sunset azimuth, and superimposing the rotated sunrise azimuth and the rotated sunset azimuth on a sunrise time and a sunset time in the time coordinate system.

FIG. 7 is a schematic view showing a state formed by rotating the actual sunrise azimuth and the actual sunset azimuth, and superimposing the rotated sunrise azimuth and the rotated sunset azimuth on the sunrise time and the sunset time in the time coordinate system. As shown in FIG. 7, if the sunrise azimuth is made to match the azimuth (As1=336.3 degrees) determined based on the sunrise time, a resultant sunset azimuth is 215.5 degrees, which is shifted from the azimuth (As2=194.25 degrees) determined based on the sunset time. This embodiment eliminates this shift by allowing for non-uniformity (skew) in the azimuth coordinate system. More specifically, on condition that the coordinates of a sunrise time and those of a sunset time in the time coordinate system respectively indicate a sunrise azimuth and a sunset azimuth in the azimuth coordinate system exactly, the azimuth coordinate system is set in such a manner that an azimuth other than the sunrise azimuth and the sunset azimuth is shifted from an actual azimuth.

The coordinates of a sunrise time and those of a sunset time in the time coordinate system (specifically, the coordinates of a sunrise azimuth and those of a sunset azimuth in the azimuth coordinate system) define the first index Ia and the second index Ib respectively described above. Thus, if the direction of the wrist terminal 1 is set in such a manner that the first index Ia or the second index Ib points to the particular direction in the display region of the LCD 14 (an upward direction from the center of the display region of the LCD 14 in FIG. 4, for example), the direction of the first index Ia or that of the second index Ib indicates a sunrise azimuth or a sunset azimuth.

Setting of the azimuth coordinate system in such a manner that an azimuth other than a sunrise azimuth and a sunset azimuth is shifted from an actual azimuth can be done by any method, as long as the coordinates of a sunrise time and those of a sunset time in the time coordinate system indicate an actual sunrise azimuth and an actual sunset azimuth in the azimuth coordinate system exactly. As an example, an actual azimuth can be associated with the azimuth coordinate system by dividing an azimuth range between the actual sunrise azimuth and the actual sunset azimuth by an angle between a sunrise azimuth and a sunset azimuth in the azimuth coordinate system.

For example, an angle dA1 from an actual sunrise azimuth to an actual sunset azimuth (an angle in the clockwise direction) is 239.2 degrees, whereas an angle dt1 from sunrise coordinates to sunset coordinates in the time coordinate system (an angle in the clockwise direction) is 217.95 degrees. Meanwhile, an angle dA2 from the actual sunset azimuth to the actual sunrise azimuth (an angle in the clockwise direction) is 120.8 degrees, whereas an angle dt2 from the sunset coordinates to the sunrise coordinates (an angle in the clockwise direction) is 142.05 degrees. An actual azimuth can be associated with the azimuth coordinate system by allocating the actual angles dA1 and dA2 in their angular ranges to the angles dt1 and dt2 respectively in their angular ranges in the azimuth coordinate system.

An angular factor $\beta$ used for conversion between the azimuth coordinate system and an actual azimuth is introduced. An angular factor $\beta 1$ for an angular range from sunrise to sunset can be determined as follows:

$$\beta 1 = dt1/dA1 = 0.9112$$

An angular factor $\beta 2$ for an angular range from sunset to sunrise can be determined as follows:

$$\beta 2 = dt2/dA2 = 1.1759$$

Each of these angular factors $\beta 1$ and $\beta 2$ indicates a conversion factor of an angle by which display of the time coordinate system and that of the azimuth coordinate system are rotated in response to change in output from the magnetic field sensor. Specifically, if output from the magnetic field sensor indicates that the magnetic field sensor has rotated 1 degree, display of the time coordinate system and that of the azimuth coordinate system are rotated 0.9112 degrees in the angular range from sunrise to sunset. Likewise, if output from the magnetic field sensor indicates that the magnetic field sensor has rotated 1 degree, display of the time coordinate system and that of the azimuth coordinate system are rotated 1.1759 degrees in the angular range from sunset to sunrise. By plotting the azimuth coordinate system calculated in the above-described method in units of predetermined angles (10 degrees, for example), a coordinate distribution in the azimuth coordinate system having a skew can be recognized visually.

Figure 8:
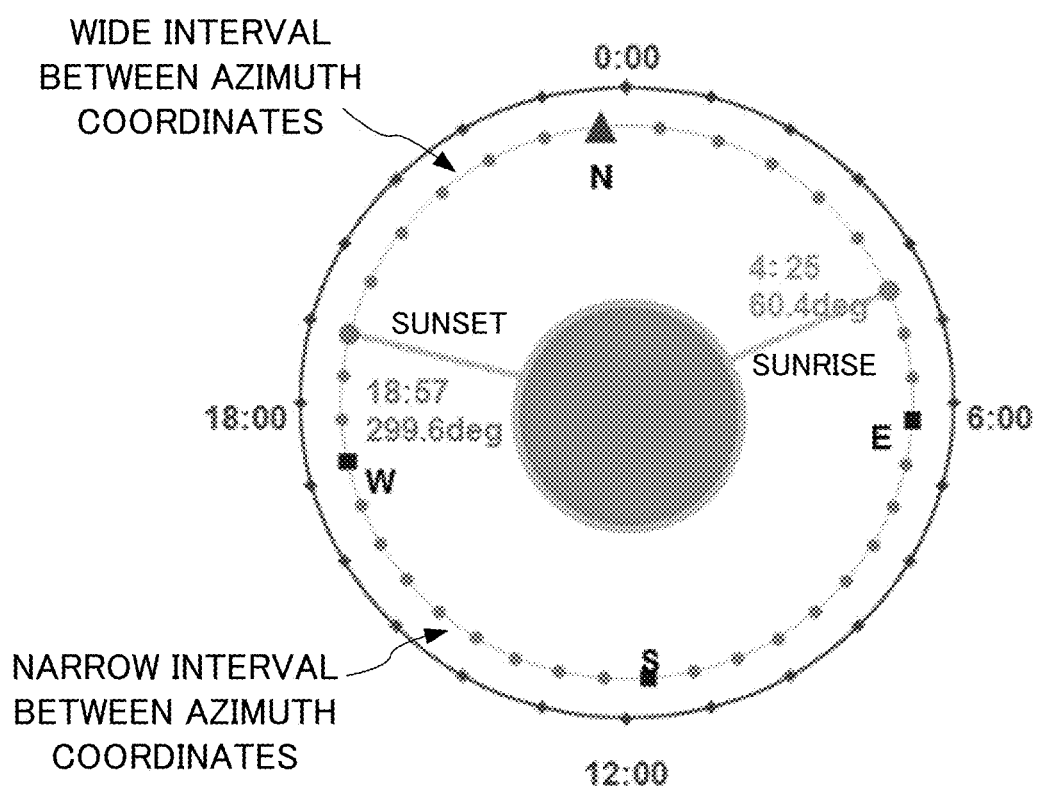
FIG. 8 is a schematic view showing a coordinate distribution in the azimuth coordinate system superimposed on (combined with) the time coordinate system.

FIG. 8 is a schematic view showing a coordinate distribution in the azimuth coordinate system superimposed on (combined with) the time coordinate system. As shown in FIG. 8, intervals between azimuth coordinates in the angular range from sunrise to sunset are narrower than intervals between azimuth coordinates in the angular range from sunset to sunrise. As described above, by giving non-uniformity (skew) in the azimuth coordinate system, while the coordinates of a sunrise azimuth and those of a sunset azimuth are fixed to the coordinates of a sunrise time and those of a sunset time respectively, times and azimuths can be displayed in association with each other. Additionally, the time coordinate system and the azimuth coordinate system associated with each other in this way are rotated so as to respond to every output from the magnetic field sensor (specifically, the direction of a user), and then the rotated time coordinate system and the rotated azimuth coordinate system are displayed.

According to this embodiment, the direction north is set at zero degrees for output from the magnetic field sensor, whereas a 6 o'clock position in FIG. 5, etc. is set at zero degrees in the azimuth coordinate system. In this way, an offset of 90 degrees is produced. Thus, the time coordinate system and the azimuth coordinate system, which are to be displayed in response to output from the magnetic field sensor, may be corrected in terms of angle by 90 degrees (rotated clockwise 90 degrees).

Figure 9:
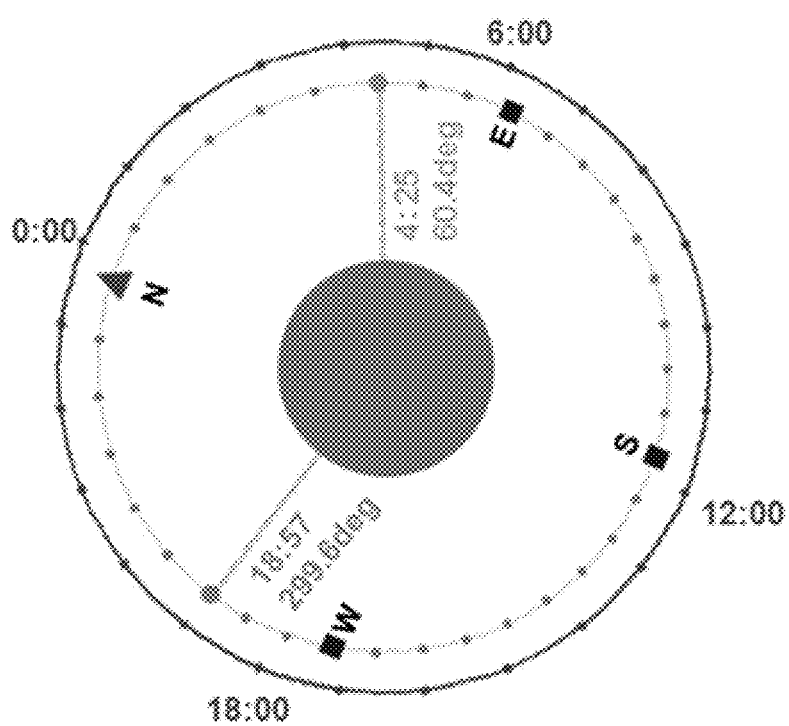
FIG. 9 is a schematic view showing a state formed by correcting the time coordinate system and the azimuth coordinate system shown in FIG. 8 in response to output from a magnetic field sensor.

FIG. 9 is a schematic view showing a state formed by correcting the time coordinate system and the azimuth coordinate system shown in FIG. 8 in response to output from the magnetic field sensor. The state of FIG. 9 is formed by rotating the time coordinate system and the azimuth coordinate system in the state of FIG. 8 clockwise to an angle responsive to output from the magnetic field sensor. According to this embodiment, the azimuth coordinate system rotated so as to respond to every output from the magnetic field sensor, and the time coordinate system including a sunrise time and a sunset time associated with the azimuth coordinate system, are displayed as an image of the face of an analog clock. The following is superimposed on the displayed image of this clock face: the first index Ia and the second index Ib; an hour hand indicating a current time; a digital indication of the current time (a time indication superimposed on the center of the hour hand); a symbol ("N" indicating the direction north, for example) as a rough indication of a direction (a direction relative to the first index Ia and the second index Ib), etc.

Figure 10A:
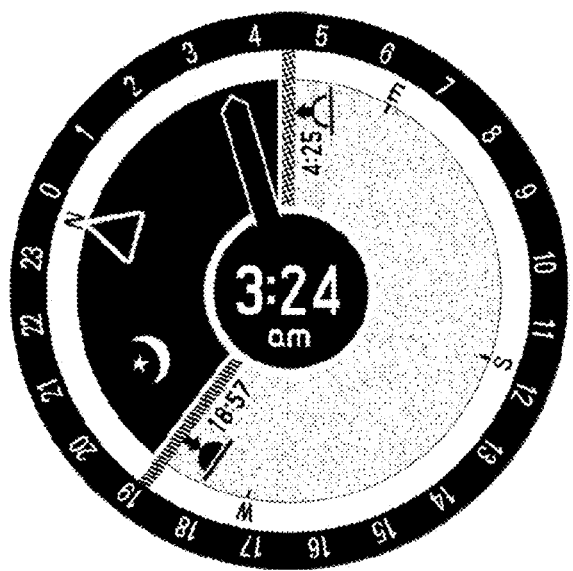
FIG. 10A is a schematic view showing a state formed by rotating display on the wrist terminal in response to output from the magnetic field sensor if output from the magnetic field sensor is 60 degrees.
Figure 10B:
FIG. 10B is a schematic view showing a state formed by rotating display on the wrist terminal in response to output from the magnetic field sensor if output from the magnetic field sensor is 300 degrees.
Figure 10C:
FIG. 10C is a schematic view showing a state formed by rotating display on the wrist terminal in response to output from the magnetic field sensor if output from the magnetic field sensor is four degrees.
Figure 10D:
FIG. 10D is a schematic view showing a state formed by rotating display on the wrist terminal in response to output from the magnetic field sensor if output from the magnetic field sensor is 86 degrees.

FIGS. 10A to 10D are schematic views each showing a state formed by rotating display on the wrist terminal 1 in response to output from the magnetic field sensor. The state of FIG. 10A is formed if output from the magnetic field sensor is 60 degrees. The state of FIG. 10B is formed if output from the magnetic field sensor is 300 degrees. The state of FIG. 10C is formed if output from the magnetic field sensor is four degrees. The state of FIG. 10D is formed if output from the magnetic field sensor is 86 degrees.

As shown in FIG. 10A, if output from the magnetic field sensor is 60 degrees, an angle in the time coordinate system corresponding to this azimuth is 336.3 degrees. This angle is corrected by 90 degrees in preparation for display to 66.3 degrees. Specifically, display on the wrist terminal 1 is rotated 66.3 degrees from a state where output from the magnetic field sensor is zero degrees. In an example given in this embodiment where an observation date is Jun. 12, 2015 and an observation point is Tokyo, a sunrise azimuth observed is 60.4 degrees. If being rounded to the nearest degree, output from the magnetic field sensor indicates this sunrise azimuth. An angle corresponding to this actual sunrise azimuth matches an angle of 336.3 degrees in the time coordinate system. This shows that, by correcting an angle by 90 degrees in preparation for display, the particular direction in the display region of the LCD 14 matches the position of 66.3 degrees, specifically, that of the first index Ia in the time coordinate system.

Likewise, as shown in FIG. 10B, if output from the magnetic field sensor is 300 degrees, an angle in the time coordinate system corresponding to this azimuth is 194.25 degrees. This angle is corrected by 90 degrees in preparation for display to 284.3 degrees. Specifically, display on the wrist terminal 1 is rotated 284.3 degrees from a state where output from the magnetic field sensor is zero degrees. In the example given in this embodiment where an observation date is Jun. 12, 2015 and an observation point is Tokyo, a sunset azimuth observed is 194.25 degrees. Output from the magnetic field sensor indicates this sunset azimuth. An angle corresponding to this actual sunset azimuth matches an angle of 194.25 degrees in the time coordinate system. This shows that, by correcting an angle by 90 degrees in preparation for display, the particular direction in the display region of the LCD 14 matches the position of 284.3 degrees, specifically, that of the second index Ib in the time coordinate system.

As shown in FIG. 10C, if output from the magnetic field sensor is four degrees, an angle in the time coordinate system corresponding to this azimuth is 269.5083 degrees. This angle is corrected by 90 degrees in preparation for display to 359.5 degrees. Specifically, display on the wrist terminal 1 is rotated 359.5 degrees from a state where output from the magnetic field sensor is zero degrees. As shown in FIG. 10D, if output from the magnetic field sensor is 86 degrees, an angle in the time coordinate system corresponding to this azimuth is 359.9902 degrees. This angle is corrected by 90 degrees in preparation for display to 90.0 degrees. Specifically, display on the wrist terminal 1 is rotated 90.0 degrees from a state where output from the magnetic field sensor is zero degrees.

As described above, an angle of rotation of the time coordinate system and that of the azimuth coordinate system are determined in a non-uniform manner in response to output from the magnetic field sensor. Thus, if the direction of the wrist terminal 1 is set in such a manner that the first index Ia or the second index Ib points to the particular direction in the display region of the LCD 14 (an upward direction from the center of the display region of the LCD 14 in FIG. 4, for example), a sunrise azimuth or a sunset azimuth can be indicated by the direction of the first index Ia or that of the second index Ib respectively in a resultant coordinate system.

[Operation]

Figure 11:
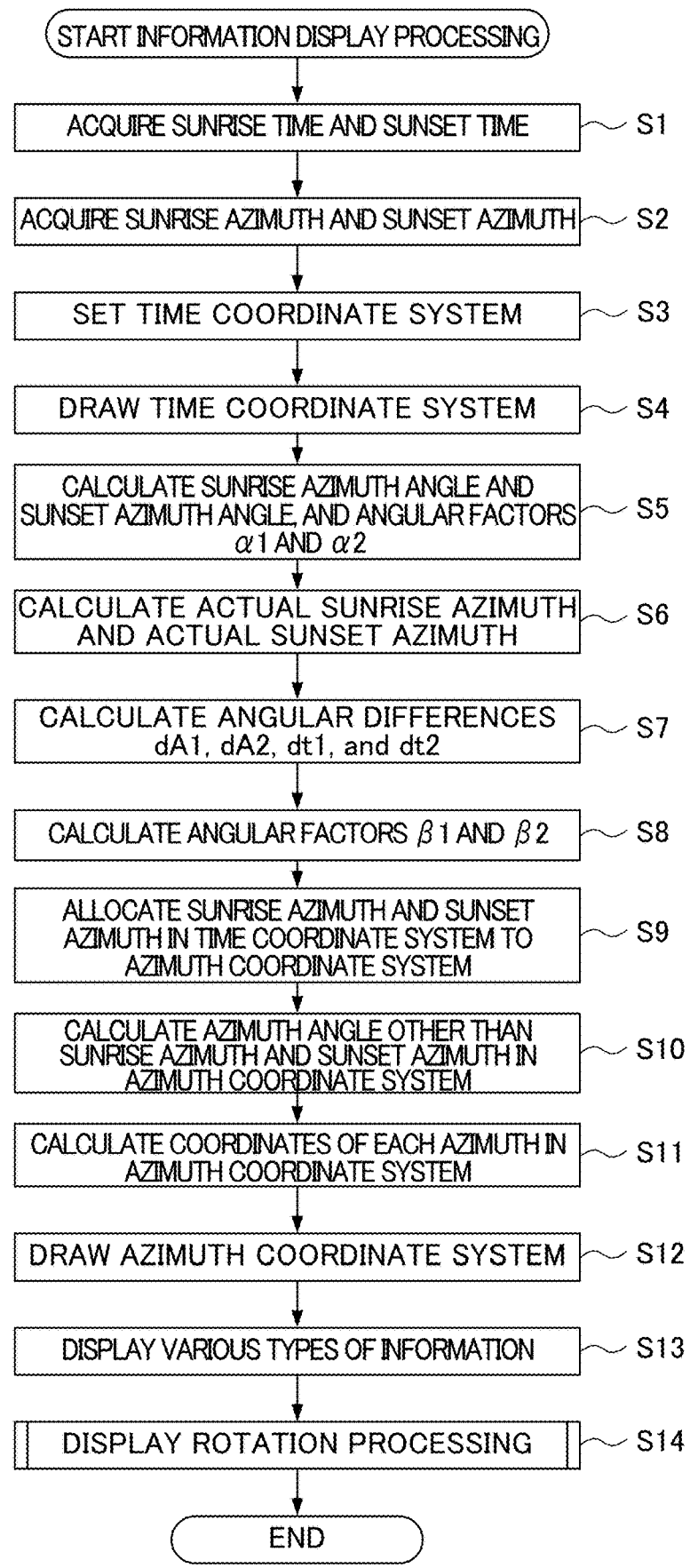
FIG. 11 is a flowchart showing a flow of information display processing executed by the wrist terminal of FIG. 1B having the functional configuration of FIG. 2.

The operation of the wrist terminal 1 will be described next. FIG. 11 is a flowchart showing a flow of the information display processing executed by the wrist terminal 1 of FIGS. 1A and 1B having the functional configuration of FIG. 2. The information display processing starts in response to input of an instruction for starting the information display processing given by a user to the input unit 13. In step S1, the azimuth coordinate setting unit 54 refers to the calendar information DB 71 to acquire a sunrise time and a sunset time of the day at a current place. In step S2, the azimuth coordinate setting unit 54 refers to the calendar information DB 71 to acquire a sunrise azimuth and a sunset azimuth of the day at the current place.

In step S3, the time coordinate setting unit 53 divides the display region of the LCD 14 uniformly in the peripheral direction and allocates the divided regions to 24-hour times to calculate the angle and the coordinates of each time, thereby setting the time coordinate system. In step S4, the display control unit 55 draws the time coordinate system. In step S5, the azimuth coordinate setting unit 54 calculates a sunrise time, a sunset time, a sunrise azimuth angle, and a sunset azimuth angle in the time coordinate system, and the angular factors α1 and α2 determined based on these times. In step S6, the azimuth coordinate setting unit 54 calculates an actual sunrise azimuth angle and an actual sunset azimuth angle in the time coordinate system.

In step S7, the azimuth coordinate setting unit 54 calculates the angular differences dA1 and dA2 between the actual sunrise azimuth and the actual sunset azimuth. The azimuth coordinate setting unit 54 further calculates the angular differences dt1 and dt2 between the sunrise azimuth and the sunset azimuth in the time coordinate system. In step S8, the azimuth coordinate setting unit 54 calculates the angular factors β1 and β2 used for conversion between the azimuth coordinate system and the actual azimuths. In step S9, the azimuth coordinate setting unit 54 allocates the sunrise azimuth and the sunset azimuth in the time coordinate system to the actual sunrise azimuth and the actual sunset azimuth in the azimuth coordinate system. In step S10, the azimuth coordinate setting unit 54 calculates an azimuth angle other than the sunrise azimuth and the sunset azimuth in the azimuth coordinate system.

In step S11, the azimuth coordinate setting unit 54 calculates the coordinates of each azimuth in the azimuth coordinate system. In step S12, the display control unit 55 draws the azimuth coordinate system. In step S13, the display control unit 55 displays various types of information including the sunrise time and the sunset time in a coordinate system resulting from superimposition (combination) of the time coordinate system and the azimuth coordinate system. In this way, a drawing screen for display on the LCD 14 is generated. In step S14, the display control unit 55 executes display rotation processing. After step S14, the information display processing ends.

Figure 12:
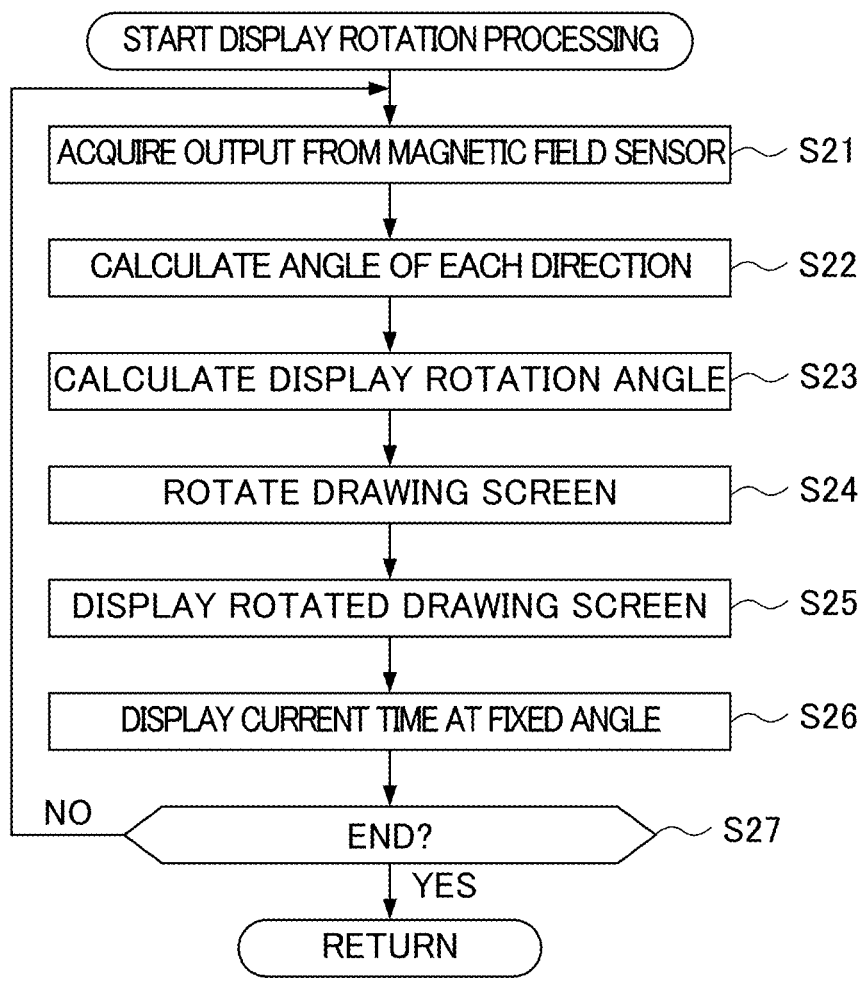
FIG. 12 is a flowchart showing a flow of display rotation processing.

The display rotation processing executed in step S14 of the information display processing will be described next. FIG. 12 is a flowchart showing a flow of the display rotation processing. In step S21, the display control unit 55 acquires output from the magnetic field sensor. In step S22, the display control unit 55 calculates the angle of each direction. In step S23, the display control unit 55 calculates a display rotation angle for display of the drawing screen. In step S24, the display control unit 55 rotates the drawing screen to the display rotation angle.

In step S25, the display control unit 55 displays the rotated drawing screen. In step S26, the display control unit 55 superimposes numbers indicating a current time at a fixed angle on the displayed rotated drawing screen. In this way, the numbers indicating the current time are always displayed at the fixed angle, irrespective of rotation of the drawing screen. In step S27, the display control unit 55 determines whether or not input of an instruction for finishing the display has been given. If input of an instruction for finishing the display has not been given, a determination of step S27 is NO. Then, the flow of the processing shifts to step S21. If input of an instruction for finishing the display has been given, a determination in step S27 is YES. Then, the flow of the processing returns to the display control processing.

As a result of the above-described processing, an actual sunrise azimuth and an actual sunset azimuth are allocated to the angle of a sunrise time and that of a sunset time in the time coordinate system where coordinates are allocated uniformly in the peripheral direction of the display region of the LCD 14. Further, the azimuth coordinate system is set by shifting an azimuth other than the sunrise azimuth and the sunset azimuth from an actual azimuth. The time coordinate system and the azimuth coordinate system are superimposed (combined). The following is superimposed on a resultant displayed coordinate system: an image of a clock face; the first index Ia indicating a sunrise time; the second index Ib indicating a sunset time; numbers indicating a current time, etc. An indication other than the numbers indicating the current time is rotated in response to output from the magnetic field sensor, and then displayed in the resultant coordinate system. Specifically, times can be displayed using coordinates allocated uniformly in the peripheral direction of the display region of the LCD 14. Regarding a sunrise azimuth and a sunset azimuth, an actual sunrise azimuth and an actual sunset azimuth can be displayed exactly by pointing the wrist terminal 1 toward the direction of the sunrise azimuth and that of the sunset azimuth. As a result, an event having a relation between a time and an azimuth can be presented as information easy to understand intuitively.

Second Embodiment

A second embodiment of the present invention will be described next. According to the first embodiment, an actual sunrise azimuth and an actual sunset azimuth are allocated to the angle of a sunrise time and that of a sunset time in the time coordinate system where coordinates are allocated uniformly in the peripheral direction of the display region of the LCD 14. Further, the azimuth coordinate system is set by shifting an azimuth other than the sunrise azimuth and the sunset azimuth from an actual azimuth. By contrast, in each of a time coordinate system and an azimuth coordinate system on the wrist terminal 1 according to this embodiment, coordinates are allocated uniformly in the peripheral direction of the display region of the LCD 14. Each of these coordinate systems is superimposed on and displayed in the display region of the LCD 14. A sunrise time and a sunset time are displayed in the time coordinate system. A sunrise azimuth and a sunset azimuth are displayed in the azimuth coordinate system. By doing so, the time coordinate system and the azimuth coordinate system can be displayed without a skew. Further, a sunrise time and a sunset time, and a sunrise azimuth and a sunset azimuth can be displayed together in the displayed coordinate systems superimposed on each other. As a result, an event having a relation between a time and an azimuth can be presented as information easy to understand intuitively.

In the wrist terminal 1 according to this embodiment, the azimuth coordinate setting unit 54 and the display control unit 55 shown in FIG. 2 have respective functions different from those of the wrist terminal 1 according to the first embodiment. Thus, the following description is mainly intended for the azimuth coordinate setting unit 54 and the display control unit 55 forming parts different from those of the first embodiment. Where appropriate, the other parts will be described by referring to the description of the first embodiment.

The azimuth coordinate setting unit 54 sets the azimuth coordinate system indicating an azimuth by dividing the display region of the LCD 14 uniformly in the peripheral direction, and allocating the divided regions to 360-degree azimuths. The azimuth coordinate system is rotated so as to respond to every information indicating an azimuth at the wrist terminal 1 acquired by the azimuth information acquiring unit 52. Then, the rotated azimuth coordinate system is displayed in the display region of the LCD 14.

Figure 13A:
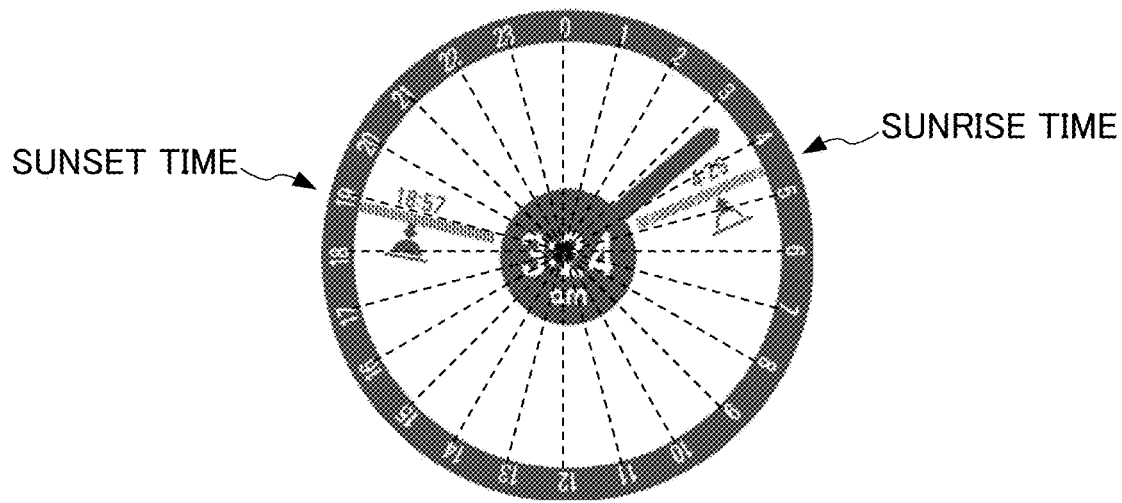
FIG. 13A is a schematic view showing a time coordinate system that is set together with an azimuth coordinate system according to an embodiment.
Figure 13B:
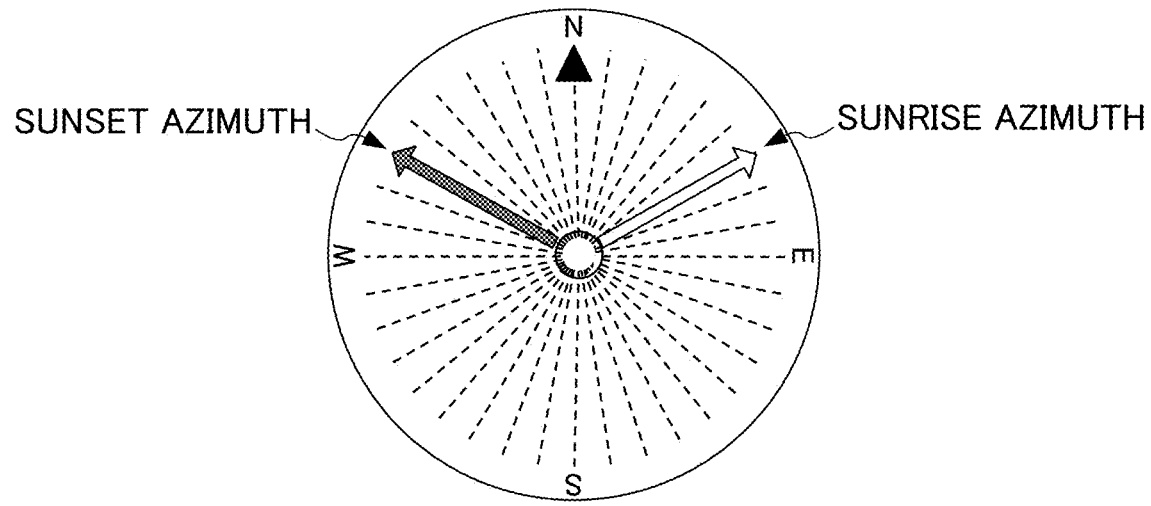
FIG. 13B is a schematic view showing the azimuth coordinate system that is set together with the time coordinate system according to the embodiment.

FIGS. 13A and 13B are schematic views showing the time coordinate system and the azimuth coordinate system set according to this embodiment. FIG. 13A shows the time coordinate system. FIG. 13B shows the azimuth coordinate system. As shown in FIGS. 13A and 13B, in the time coordinate system and the azimuth coordinate system, the coordinates of corresponding times and the coordinates of corresponding azimuths are allocated uniformly in the peripheral direction of the display region of the LCD 14. Referring to FIG. 13A, each of the position of a sunrise time and that of a sunset time is displayed together with an icon indicating sunrise or sunset and numbers indicating the time of sunrise or that of sunset. The position of 4:25 in the time coordinate system shows a sunrise time, and the position of 18:57 in the time coordinate system shows a sunset time. Referring to FIG. 13B, each of the position of a sunrise azimuth and that of a sunset azimuth is displayed. With the direction north in the azimuth coordinate system set at zero degrees, the position of 60.4 degrees corresponds to the sunrise azimuth and the position of 299.6 degrees corresponds to the sunset azimuth. As described above, in each of the time coordinate system and the azimuth coordinate system according to this embodiment, coordinates are allocated uniformly in the peripheral direction of the display region of the LCD 14. A sunrise time and a sunset time are displayed in the time coordinate system. A sunrise azimuth and a sunset azimuth are displayed in the azimuth coordinate system.

Figure 14:
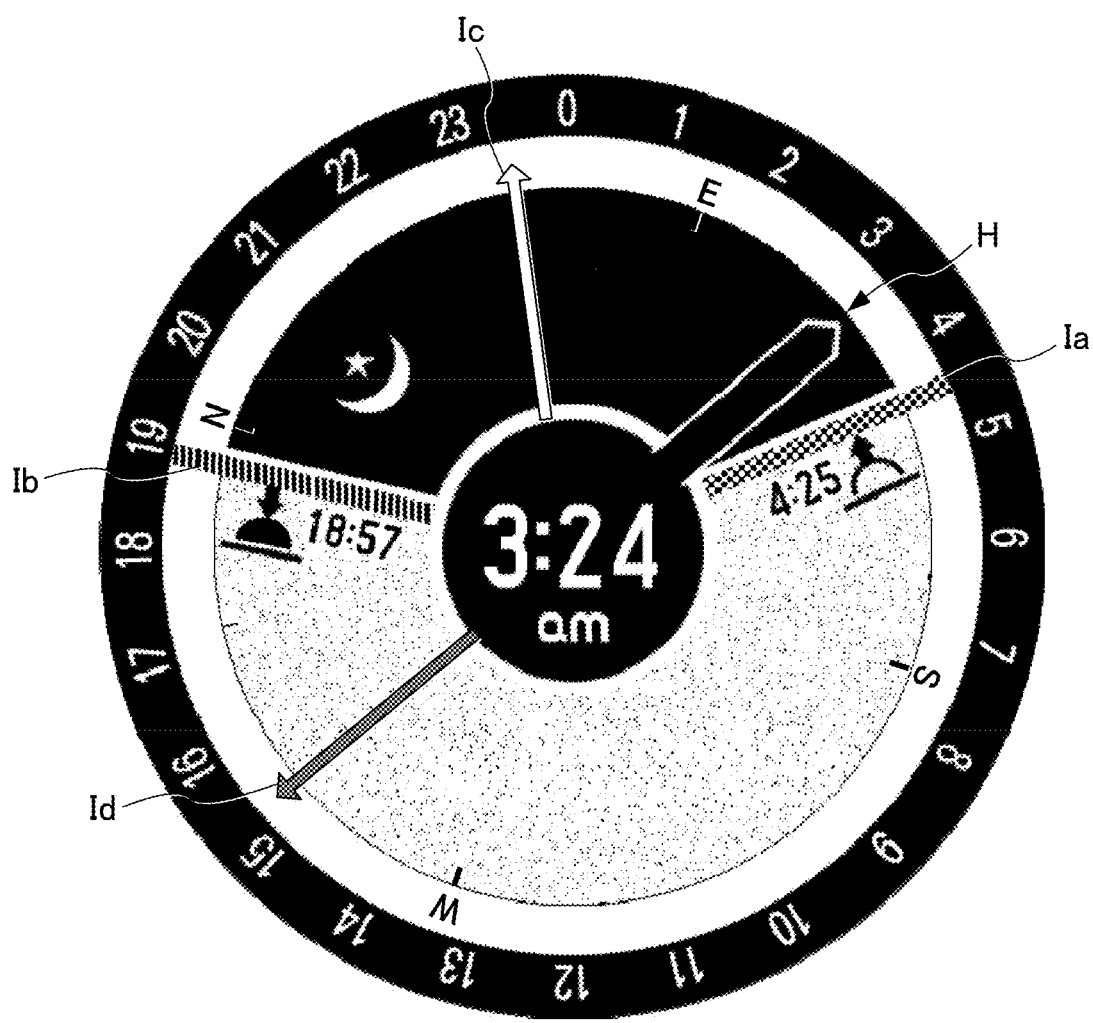
FIG. 14 is a schematic view showing an example of a display image displayed by the display control unit.

The display control unit 55 displays various types of information including a sunrise time, a sunset time, a sunrise azimuth, and a sunset azimuth in a coordinate system formed by superimposing (combining) the time coordinate system set by the time coordinate setting unit 53 and the azimuth coordinate system associated with the time coordinate system. The display control unit 55 rotates the azimuth coordinate system superimposed on the time coordinate system so as to respond to every output from the magnetic field sensor (specifically, the direction of a user), and displays the rotated azimuth coordinate system on the LCD 14. According to this embodiment, the time coordinate system is fixed in the display region of the LCD 14. Only the azimuth coordinate system is rotated and the rotated azimuth coordinate system is displayed. FIG. 14 is a schematic view showing an example of a display image displayed by the display control unit 55. As shown in FIG. 14, the display control unit 55 displays an image of the face of an analog clock in which an hour hand H rotates about the center of the display region of the LCD 14. The display control unit 55 also displays a first index Ia indicating a sunrise time, a second index Ib indicating a sunset time, a third index Ic indicating a sunrise azimuth, and a fourth index Id indicating a sunset azimuth in the image of the clock face.

In the image of the clock face, the first index Ia is expressed as a line segment connecting the center of the display region and a sunrise time in the time coordinate system (here, "4:25"). Likewise, in the image of the clock face, the second index Ib is expressed as a line segment connecting the center of the display region and a sunset time in the time coordinate system (here, "18:57"). The sunrise time and the sunset time are displayed as numerical values near the first index Ia and the second index Ib respectively. In the time coordinate system, the first index Ia and the second index Ib partition the display region into a region corresponding to daytime and shown in a bright color (white, for example), and a region corresponding to nighttime and shown in a dark color (black, for example). An icon indicating sunrise and an icon indicating sunset are displayed near the first index Ia and the second index Ib respectively.

In the image of the clock face, the third index Ic is expressed as an arrow line connecting the center of the display region and a sunrise azimuth in the azimuth coordinate system (here, "60.4 degrees"). Likewise, in the image of the clock face, the fourth index Id is expressed as an arrow line connecting the center of the display region and a sunset azimuth in the azimuth coordinate system (here, "299.6 degrees"). According to this embodiment, each azimuth in the azimuth coordinate system indicates an actual azimuth. A direction indicated in FIG. 14 (such as "N" indicating the direction north) indicates a substantially exact direction.

With the above-described configuration, the wrist terminal 1 according to this embodiment executes information display processing like the one shown in FIG. 11 according to the first embodiment. According to this embodiment, steps S5 to S10 in the information display processing of FIG. 11 are omitted. In step S11, the coordinates of corresponding azimuths in the azimuth coordinate system including a sunrise azimuth and a sunset azimuth are calculated. In step S13, various types of information including a sunrise time, a sunset time, a sunrise azimuth, and a sunset azimuth are displayed in a coordinate system resulting from superimposition (combination) of the time coordinate system and the azimuth coordinate system. In this step according to this embodiment, the sunrise time and the sunset time, and the sunrise azimuth and the sunset azimuth are displayed independently. In display rotation processing in step S14 according to this embodiment, the time coordinate system is fixed in the display region of the LCD 14. Only the azimuth coordinate system (specifically, azimuth information displayed in the azimuth coordinate system including the sunrise azimuth and the sunset azimuth) is rotated in response to output from the magnetic field sensor and the rotated azimuth coordinate system is displayed.

As a result of the above-described processing, in each of the time coordinate system and the azimuth coordinate system on the wrist terminal 1 according to this embodiment, coordinates are allocated uniformly in the peripheral direction of the display region of the LCD 14. Each of these coordinate systems is superimposed on and displayed in the display region of the LCD 14. A sunrise time and a sunset time are displayed in the time coordinate system. A sunrise azimuth and a sunset azimuth are displayed in the azimuth coordinate system. By doing so, the time coordinate system and the azimuth coordinate system can be displayed without a skew. Further, a sunrise time and a sunset time, and a sunrise azimuth and a sunset azimuth can be displayed together in the displayed coordinate systems superimposed on each other. As a result, an event having a relation between a time and an azimuth can be presented as information easy to understand intuitively.

According to the above-described embodiments, a display rotation angle for display of the time coordinate system, the azimuth coordinate system, or the drawing screen is calculated and acquired, as occasion arises. However, this is not the only case. A list containing a display rotation angle for display of the time coordinate system, the azimuth coordinate system, or the drawing screen, etc. may be stored in a table in advance. The display rotation angle for display of the time coordinate system, the azimuth coordinate system, or the drawing screen may be acquired by referring to this list. The above-described display rotation angle is calculated at the wrist terminal 1, as occasion arises. Alternatively, as occasion arises, this display rotation angle can be calculated at a different device (such as a smartphone or a server) with which the wrist terminal 1 can communicate. Still alternatively, this display rotation angle can be stored in a list form in a table. In this case, the wrist terminal 1 becomes capable of providing the same display as that of the above-described embodiments by transmitting positional information (such as a current position) to the different device and acquiring a display rotation angle corresponding to the transmitted positional information from the different device. In the above-described embodiments, a sunrise time, a sunset time, a sunrise azimuth, and a sunset azimuth may be corrected based on output from an altitude sensor, for example.

In the above-described embodiments, the calendar information DB 71 stores sunrise times, sunset times, sunrise azimuths, and sunset azimuths covering a predetermined length of time observed at principal points. However, this is not the only case. A sunrise time, a sunset time, a sunrise azimuth, and a sunset azimuth may be calculated, as occasion arises, based on a current time and a current position acquired by a GPS, for example. In the examples according to the above-described embodiments, a sunrise time, a sunset time, a sunrise azimuth, and a sunset azimuth are displayed. However, this is not the only case. The present invention is applicable to various events each having a relation between a time and an azimuth including not only sunrise and sunset but also the rising and setting of a different celestial body such as the moon. According to the first embodiment, the time coordinate setting unit 53 sets the time coordinate system in 24-hour notation by allocating coordinates uniformly in the peripheral direction of the display region of the LCD 14, and allocates the coordinates of a sunrise azimuth and those of a sunset azimuth fixedly to the position of a sunrise time and that of a sunset time in the time coordinate system respectively. The azimuth coordinate setting unit 54 sets the azimuth coordinate system by allocating coordinates between the sunrise azimuth and the sunset azimuth in such a manner as to conform to these azimuths. However, this is not the only case. The azimuth coordinate setting unit 54 may set an azimuth coordinate system by allocating coordinates uniformly in the peripheral direction of the display region of the LCD 14, and allocate the coordinates of a sunrise time and those of a sunset time fixedly to the position of a sunrise azimuth and that of a sunset azimuth in the azimuth coordinate system respectively. Further, the time coordinate setting unit 53 may set a time coordinate system in 24-hour notation by allocating coordinates between the sunrise time and the sunset time in such a manner as to conform to these times.

The wrist terminal 1 with the above-described configuration includes the time information acquiring unit 51, the azimuth information acquiring unit 52, the LCD 14, the time coordinate setting unit 53, the azimuth coordinate setting unit 54, and the display control unit 55. The time information acquiring unit 51 acquires time information. The azimuth information acquiring unit 52 acquires azimuth information. The time coordinate setting unit 53 sets a time coordinate system for display of the time information on the LCD 14. The azimuth coordinate setting unit 54 sets an azimuth coordinate system for display of the azimuth information on the LCD 14. The display control unit 55 displays particular time information acquired by the time information acquiring unit 51, in the time coordinate system set on the LCD 14 and particular azimuth information acquired by the azimuth information acquiring unit 52, in the azimuth coordinate system set on the LCD 14. By doing so, an event having a relation between a time and an azimuth can be presented as information easy to understand intuitively.

The display control unit 55 displays the particular time information and the particular azimuth information in a coordinate system on the LCD 14 formed by combining the time coordinate system and the azimuth coordinate system. By doing so, the particular time information and the particular azimuth information can be displayed in relation to each other in the coordinate system formed by combining the time coordinate system and the azimuth coordinate system.

The time coordinate setting unit 53 and the azimuth coordinate setting unit 54 associate the position of the particular time information in the time coordinate system with the position of the particular azimuth information relating to the particular time information, and make coordinate conversion on at least one of the time coordinate system and the azimuth coordinate system based on the position of the particular time information and the position of the particular azimuth information. The display control unit 55 combines the time coordinate system and the azimuth coordinate system after the coordinate conversion. By doing so, the time information and the azimuth information can be displayed in a coordinate system formed by combining one coordinate system as a reference and a different coordinate system so as to make the different coordinate system conform to the reference coordinate system.

The time coordinate setting unit 53 allocates coordinates in the time coordinate system uniformly in the peripheral direction of the display region of the LCD 14. The azimuth coordinate setting unit 54 sets the azimuth coordinate system by associating the particular azimuth information relating to the particular time information with the position of the particular time information in the time coordinate system, and allocating azimuth information other than the particular azimuth information relating to the particular time information to the time coordinate system in such a manner as to conform to the particular azimuth information relating to the particular time information. By doing so, times can be displayed using coordinates allocated uniformly in the peripheral direction of the display region of the LCD 14. Further, the azimuth information relating to the particular time information can be displayed exactly.

The azimuth information relating to the particular time information includes first azimuth information relating to first time information, and second azimuth information relating to second time information. The azimuth coordinate setting unit 54 associates the first azimuth information relating to the first time information with the time coordinate system, associates the second azimuth information relating to the second time information with the time coordinate system, and allocates azimuth coordinates between the first azimuth information and the second azimuth information to time coordinates between the first time information and the second time information. By doing so, non-uniformity (skew) is generated in the azimuth between the first azimuth information and the second azimuth information. Further, the first azimuth information and the second azimuth information are fixed to the corresponding time coordinates. In this state, times and azimuths can be displayed in association with each other.

The display control unit 55 displays information in the azimuth coordinate system on the LCD 14 that indicates a direction relative to the azimuth information relating to the particular time information. This allows display of rough indication of a direction at the wrist terminal 1.

The azimuth coordinate setting unit 54 allocates azimuth coordinates uniformly in the peripheral direction of the display region of the LCD 14. The time coordinate setting unit 53 sets the time coordinate system by associating the particular time information relating to the particular azimuth information with the position of the particular azimuth information in the azimuth coordinate system, and allocating time information other than the particular time information relating to the particular azimuth information to the azimuth coordinate system in such a manner as to conform to the particular time information relating to the particular azimuth information. By doing so, azimuths can be displayed using coordinates allocated uniformly in the peripheral direction of the display region of the LCD 14.

The display control unit 55 displays the particular time information and the particular azimuth information in a coordinate system on the LCD 14 formed by combining the time coordinate system and the azimuth coordinate system. By doing so, the time coordinate system and the azimuth coordinate system can be displayed without a skew. Further, the particular time information and the particular azimuth information can be displayed together in the displayed coordinate systems superimposed on each other.

The particular time information is a time of rising and a time of setting of a celestial body. The azimuth information relating to the particular time information is an azimuth of rising and an azimuth of setting of the celestial body. Thus, a time of rising and a time of setting of the celestial body can be presented as information easy to understand intuitively.

It should be noted that the present invention is not to be limited to the aforementioned embodiment, and that modifications, improvements, etc. within a scope that can achieve the objects of the present invention are also included in the present invention.

In the aforementioned embodiments, the wrist terminal has been described as an example of an electronic apparatus to which the present invention is applied, but the present invention is not limited thereto in particular. For example, the present invention can be applied to any electronic device in general having a function of estimating a location. More specifically, for example, the present invention can be applied to a notebook-type personal computer, a television receiver, a video camera, a portable navigation device, a cell phone device, a smart phone, a portable gaming device, and the like.

The processing sequence described above can be executed by hardware, and can also be executed by software. In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the wrist terminal 1 can be provided with the functions enabling the aforementioned processing sequence to be executed in its entirety. A single functional block may be configured by a single piece of hardware, a single installation of software, or any combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, a program configuring the software is installed from a network or a storage medium into a computer or the like. The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1B distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trade Mark) or the like. The magnetic optical disk is composed of an MD (Mini-Disk) or the like. The storage medium supplied to the user in a state incorporated in the device main body in advance may include, for example, the ROM 16 shown in FIG. 1B or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An information display device comprising a processor, the processor executing:
   time information acquiring processing of acquiring time information;
   azimuth information acquiring processing of acquiring azimuth information corresponding to the information display device, wherein the acquired azimuth information includes magnetic field information acquired from a magnetic field sensor;
   coordinate setting processing of setting a time coordinate system for display of the time information on a display image and setting an azimuth coordinate system for display of the azimuth information on a plane on the display image, wherein east, west, north and south are set respectively at four different points on the edge of the display screen; and
   display control processing of controlling a display to display particular time information acquired by the time information acquiring processing, in the time coordinate system set on the display image and particular azimuth information acquired by the azimuth information acquiring processing, in the azimuth coordinate system set on the display image,
   wherein the particular time information and the particular azimuth information is indicated by a same one indicator.

2. The information display device according to claim 1, wherein in the display control processing, the particular time information and the particular azimuth information are displayed in a coordinate system formed by combining the time coordinate system and the azimuth coordinate system in the display processing, wherein the coordinate axes of the azimuth coordinate system are skewed to match the time coordinate system.

3. The information display device according to claim 2, wherein in the time coordinate setting processing and the azimuth coordinate setting processing, the position of the particular time information in the time coordinate system is associated with the position of the particular azimuth information relating to the particular time information, and coordinate conversion is made on at least one of the time coordinate system and the azimuth coordinate system based on the position of the particular time information and the position of the particular azimuth information, and
   in the display control processing, the time coordinate system and the azimuth coordinate system after the coordinate conversion are combined.

4. The information display device according to claim 3, wherein in the time coordinate setting processing, coordinates in the time coordinate system are allocated uniformly in a peripheral direction of a display region of the display image generated in the display processing, and
   in the azimuth coordinate setting processing, the azimuth coordinate system is set by associating the particular azimuth information relating to the particular time information with the position of the particular time information in the time coordinate system, and allocating azimuth information other than the particular azimuth information relating to the particular time information to the time coordinate system in such a manner as to conform to the azimuth information relating to the particular time information.

5. The information display device according to claim 4, wherein the azimuth information relating to the particular time information includes first azimuth information relating to first time information, and second azimuth information relating to second time information, and
   in the azimuth coordinate setting processing, the first azimuth information relating to the first time information is associated with the time coordinate system, the second azimuth information relating to the second time information is associated with the time coordinate system, and azimuth coordinates between the first azimuth information and the second azimuth information are allocated to time coordinates between the first time information and the second time information.

6. The information display device according to claim 3, wherein the azimuth information relating to the particular time information includes first azimuth information relating to first time information, and second azimuth information relating to second time information, and
   in the azimuth coordinate setting processing, the first azimuth information relating to the first time information is associated with the time coordinate system, the second azimuth information relating to the second time information is associated with the time coordinate system, and azimuth coordinates between the first azimuth information and the second azimuth information are allocated to time coordinates between the first time information and the second time information.

7. The information display device according to claim 3, wherein in the azimuth coordinate setting processing, coordinates in the azimuth coordinate system are allocated uniformly in the peripheral direction of the display region of the display, and
   in the time coordinate setting processing, the time coordinate system is set by associating the particular time information relating to the particular azimuth information with the position of the particular azimuth information in the azimuth coordinate system, and allocating time information other than the particular time information relating to the particular azimuth information to the azimuth coordinate system in such a manner as to conform to the time information relating to the particular azimuth information.

8. The information display device according to claim 2, wherein in the time coordinate setting processing, coordinates in the time coordinate system are allocated uniformly in a peripheral direction of a display region of the display image generated in the display processing, and in the azimuth coordinate setting processing, the azimuth coordinate system is set by associating the particular azimuth information relating to the particular time information with the position of the particular time information in the time coordinate system, and allocating azimuth information other than the particular azimuth information relating to the particular time information to the time coordinate system in such a manner as to conform to the azimuth information relating to the particular time information.

9. The information display device according to claim 8, wherein the azimuth information relating to the particular time information includes first azimuth information relating to first time information, and second azimuth information relating to second time information, and in the azimuth coordinate setting processing, the first azimuth information relating to the first time information is associated with the time coordinate system, the second azimuth information relating to the second time information is associated with the time coordinate system, and azimuth coordinates between the first azimuth information and the second azimuth information are allocated to time coordinates between the first time information and the second time information.

10. The information display device according to claim 8, wherein the azimuth information acquiring processing of
acquiring azimuth information acquires the azimuth information repeatedly; and
wherein the display controlling processing of controlling the display to rotate the displayed image based on a difference between current acquired azimuth information and previous acquired azimuth information.

11. The information display device according to claim 2, wherein the azimuth information relating to the particular time information includes first azimuth information relating to first time information, and second azimuth information relating to second time information, and in the azimuth coordinate setting processing, the first azimuth information relating to the first time information is associated with the time coordinate system, the second azimuth information relating to the second time information is associated with the time coordinate system, and azimuth coordinates between the first azimuth information and the second azimuth information are allocated to time coordinates between the first time information and the second time information.

12. The information display device according to claim 11, wherein the azimuth information acquiring processing of
acquiring azimuth information acquires the azimuth information repeatedly; and
wherein the display controlling processing of controlling the display to rotate the displayed image based on a difference between current acquired azimuth information and previous acquired azimuth information.

13. The information display device according to claim 2, wherein in the azimuth coordinate setting processing, coordinates in the azimuth coordinate system are allocated uniformly in the peripheral direction of the display region of the display, and in the time coordinate setting processing, the time coordinate system is set by associating the particular time information relating to the particular azimuth information with the position of the particular azimuth information in the azimuth coordinate system, and allocating time information other than the particular time information relating to the particular azimuth information to the azimuth coordinate system in such a manner as to conform to the time information relating to the particular azimuth information.

14. The information display device according to claim 2, wherein an east-west axis of the azimuth coordinate system is skewed to fit the time coordinate system.

15. The information display device according to claim 1, wherein in the display control processing, information in the azimuth coordinate system is displayed on the display image that indicates a direction relative to the azimuth information relating to the particular time information.

16. The information display device according to claim 1, wherein in the display control processing, the particular time information and the particular azimuth information are displayed in a coordinate system formed by combining the time coordinate system and the azimuth coordinate system on the display image.

17. The information display device according to claim 1, wherein the particular time information is a time of rising and a time of setting of a celestial body, and the particular azimuth information is an azimuth of rising and an azimuth of setting relating to the time of rising and the time of setting of the celestial body respectively.

18. The information display device according to claim 1, wherein the azimuth information acquiring processing of
acquiring azimuth information acquires the azimuth information repeatedly; and
wherein the display controlling processing of controls the display to rotate the displayed image based on a difference between current acquired azimuth information and previous acquired azimuth information.

19. An information display method implemented by an information display device, comprising:
time information acquiring processing of acquiring time information;
azimuth information acquiring processing of acquiring azimuth information corresponding to the information display device, wherein the acquired azimuth information includes magnetic field information acquired from a magnetic field sensor;
coordinate setting processing of setting a time coordinate system for display of the time information on a display image and setting an azimuth coordinate system for display of the azimuth information on a plane on the display image, wherein east, west, north and south are set respectively at four different points on the edge of the display screen; and
display control processing of controlling a display to display particular time information acquired by the time information acquiring processing, in the time coordinate system set on the display image and particular azimuth information acquired by the azimuth information acquiring processing, in the azimuth coordinate system set on the display image,
wherein the particular time information and the particular azimuth information is indicated by a same one indicator.

20. A non-transitory storage medium encoded with a computer-readable program that controls a processor of an information display apparatus to execute:

time information acquiring processing of acquiring time information;

azimuth information acquiring processing of acquiring azimuth information corresponding to the information display apparatus, wherein the acquired azimuth information includes magnetic field information acquired from a magnetic field sensor;

coordinate setting processing of setting a time coordinate system for display of the time information on a display image and setting an azimuth coordinate system for display of the azimuth information on a plane on the display image, wherein east, west, north and south are set respectively at four different points on the edge of the display screen; and display control processing of controlling a display to display particular time information acquired by the time information acquiring processing, in the time coordinate system set on the display image and particular azimuth information acquired by the azimuth information acquiring processing, in the azimuth coordinate system set on the display image, wherein the particular time information and the particular azimuth information is indicated by a same one indicator.

* * * * *